Dec. 31, 1935.　　　C. W. SPICER　　　2,026,076
AXLE GENERATOR DRIVE
Filed April 10, 1931　　　2 Sheets-Sheet 1

Inventor
Clarence W. Spicer

Dec. 31, 1935.  C. W. SPICER  2,026,076
AXLE GENERATOR DRIVE
Filed April 10, 1931    2 Sheets-Sheet 2
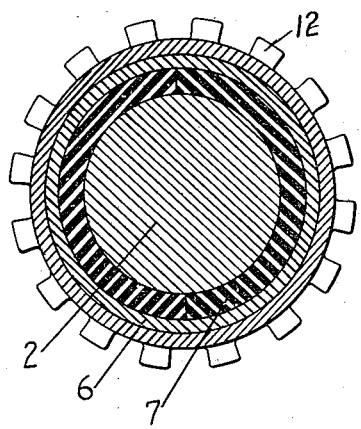
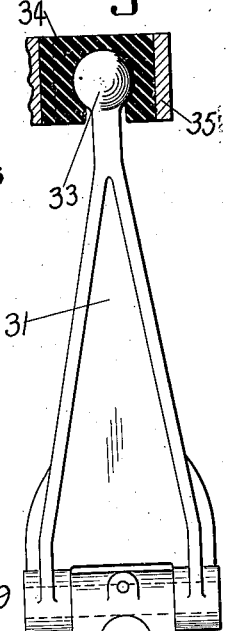
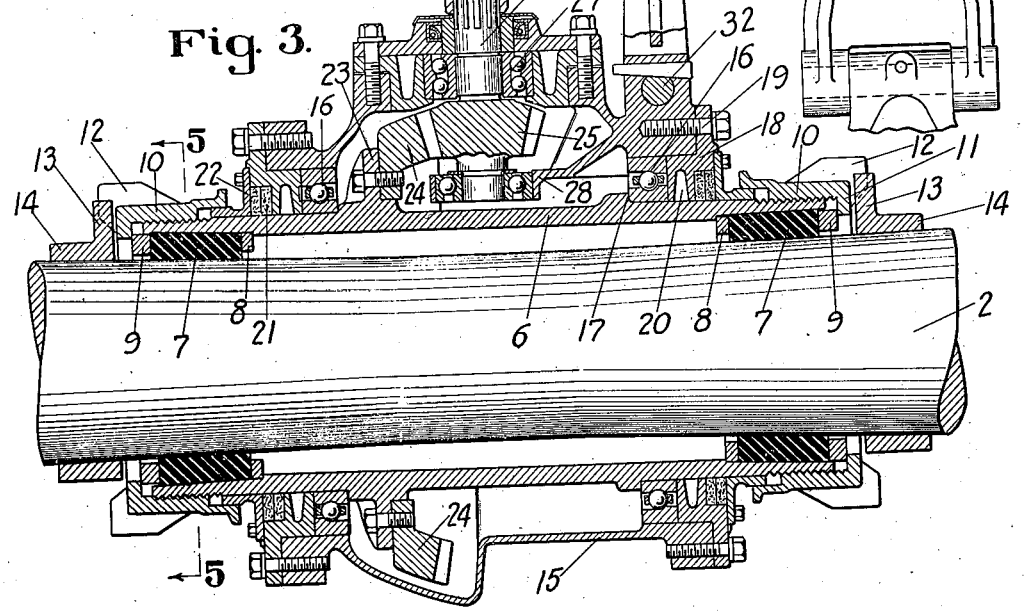
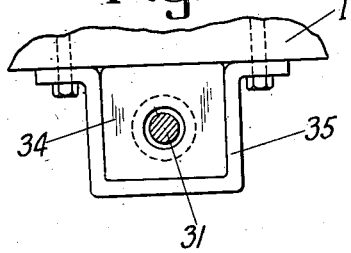
Inventor
Clarence W. Spicer
By  Owen & Owen,
Attorneys.

Patented Dec. 31, 1935

2,026,076

UNITED STATES PATENT OFFICE 2,026,076

AXLE GENERATOR DRIVE

Clarence W. Spicer, Toledo, Ohio, assignor to Spicer Manufacturing Corporation, Toledo, Ohio, a corporation of Virginia Application April 10, 1931, Serial No. 529,141

11 Claims. (Cl. 105—131)

This invention relates to axle driven generator transmission apparatus of the type commonly used on railway passenger cars, and has particular reference to positive means for transmitting the driving power from an axle to an associated generator.

An object of the invention is the provision of a simple and highly efficient positive generator drive of this character, which is adapted to drive the generator at full load under all operating conditions, which may be applied to a standard axle as a complete previously adjusted unit, which has all gears and bearings copiously lubricated and thoroughly protected from dirt or other foreign substances.

A further object of the invention is the provision of a yielding connection between the axle and power-transmitting means which cushions the driving action, absorbs vibration which may be present in the axle, permits all normal flexing of the axle without distortion of or injury to the transmission means, and prolongs the life and efficient working qualities of the drive.

Further objects and advantages of the invention will be apparent from the following description and from the accompanying drawings representing one embodiment of the invention, in which—

Figure 1:
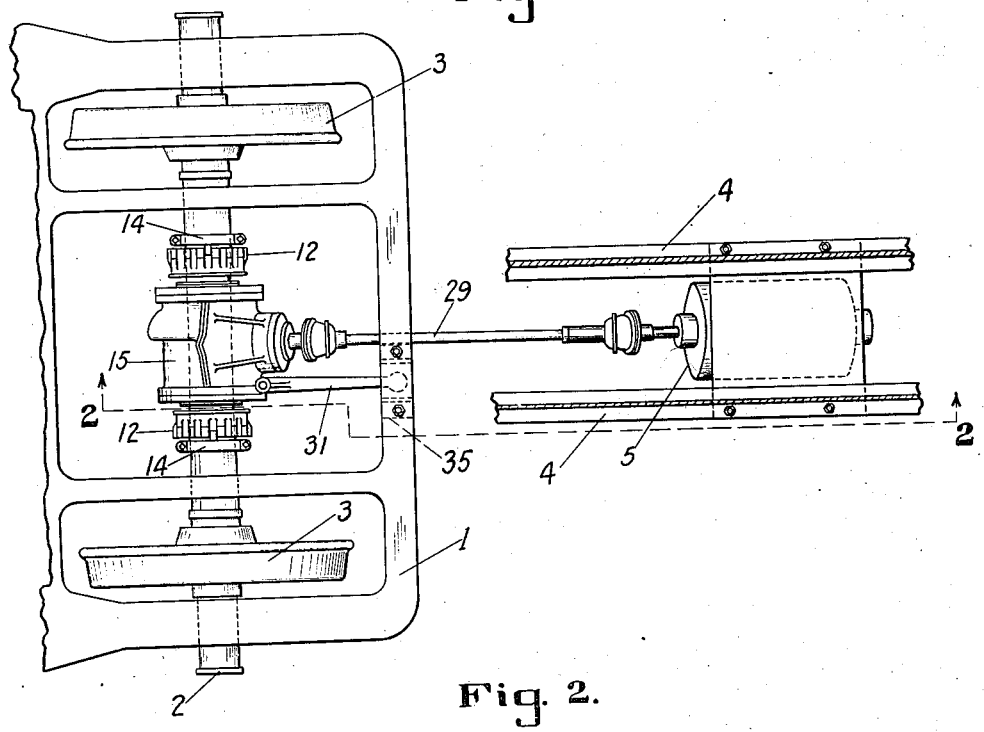
Figure 2:
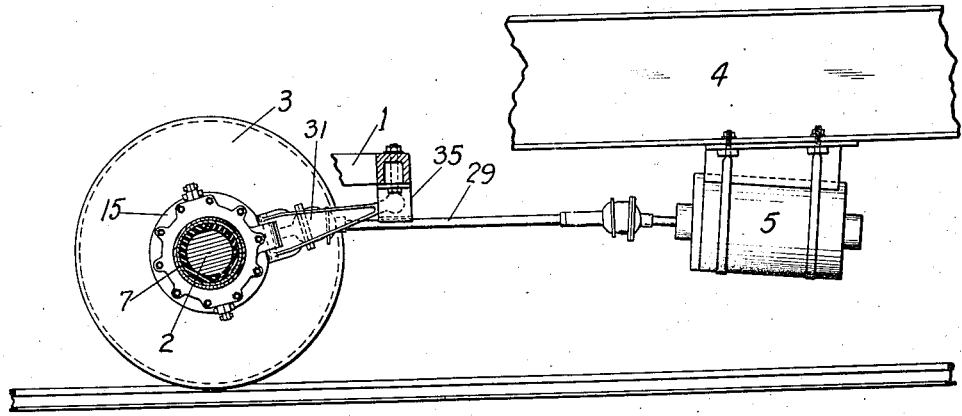

Figure 1 is a plan view of a drive embodying the invention applied to the associated parts of a car. Fig. 2 is a section on the line 2—2 in Fig. 1. Fig. 3 is an enlarged central longitudinal section of a drive embodying the invention applied to an axle, with the latter and other associated parts fragmentarily shown. Fig. 4 is a section on the line 4—4 in Fig. 3, with the associated torque-arm in full. Fig. 5 is a section on the line 5—5 in Fig. 3, and Fig. 6 is a section on the line 6—6 in Fig. 3.

Referring to the drawings, 1 designates the truck-frame of a railway car, 2 an axle mounted therein, 3 the wheels carried by the axle, 4 the bottom frame sills of the car, shown, in the present instance, as extending lengthwise therepresent, and 5 a generator carried by said sills. The axle 2 is of the usual type, having its central portion gradually reduced in diameter from opposite directions to facilitate flexing of the axle within predetermined limits to comply with the usual practice.

In the illustrated embodiment of the invention, 6 designates a quill or sleeve on which the housing and transmission parts encircling the axle are mounted, said sleeve being disposed over the central reduced portion of the axle and concentrically spaced therefrom by yielding drive collars 7, disposed between the respective ends of the sleeve and the axle. These collars are of any suitable yielding material, such, for instance, as soft rubber, and engage at their ends with inner and outer holding or binding rings, 8 and 9, respectively, of a relatively nonyielding material. Each end of the sleeve 6 is internally milled or recessed to receive a respective collar 7 and holding rings, 8 and 9, and to form a shoulder at the inner end against which the inner ring 8 seats. The collars 7 and rings 8 and 9 are preferably of split form to adapt them to be easily applied to or removed from an anxle, and the rings 8 and 9 are of an internal diameter to adapt them to be spaced sufficiently from the axle to permit a limited floating movement of the axle within the sleeve.

A clamping or holding collar 10 for each ring 9 is threaded on the respective end of the sleeve 6, and is provided at its outer end with an inturned flange 11, which has shouldered coaction with the outer side of said ring. It is thus apparent that a tightening of the collar 10 on the sleeve 6 will cause the ring 9 to firmly hold the yielding collar 7 against the inner ring 8, and also to compress the collar sufficiently in an axial direction to radially thicken and effect a firm frictional engagement of the collar with the coacting surfaces of both the axle and the sleeve, so that a yielding driving action will be communicated from one to the other through the collars. Each clamping collar 10 is provided at its outer edge with a plurality of lugs 12 forming a circumferential series of spaces into any one of which a lug 13 on a lock collar 14 may be projected. The collars 14 are clamped to the axle 2 to turn therewith, and are preferably of split form to permit an easy removal from or application to the axle. It is, of course, apparent that the lugs 12 and 13 should have a sufficiently free engagement to enable the sleeve 6 to have the yielding movement relative to the axle permitted by the interposed yielding or cushion drive members 7.

The customary housing 15 for the transmission-gearing is mounted on the sleeve 6 through the medium of annular ball-bearing sets 16 at the opposite sides of the longitudinal center of the sleeve, whereby the sleeve is permitted to freely turn within the housing. Each ball-bearing set 16 shoulders at its inner side against a respective annular shoulder 17 on the sleeve 6, and is protected at its outer side by a collar 18, which is secured to the respective end of the housing by screws 19 and is provided with an internal oil groove 20 for the purpose well understood in the art. The inner edge portion of the collar 18 is undercut or recessed at its outer side to receive a packing 21 of felt, or other suitable material, to prevent the entrance of dust and water and the leakage of lubricant from the joints formed between the sleeve 6 and housing ends. The packing 21 is held in position by annular plates 22, which are outwardly flanged at their inner edge portions to adapt the undercut inner edge portions of the collars 10 to coact therewith to exclude foreign material as shown. The housing 15 is of the split type to permit easy assembly thereof.

The sleeve 6 is provided within the housing 15 and at one side of its longitudinal center with an annular flange 23 to which a ring-gear 24 may be attached, and this gear meshes with a pinion 25 carried within the housing by a shaft 26. This shaft projects without the housing through a suitable bearing 27 provided therein and has its inner end mounted in a bearing-support 28 provided within the housing. The pinion shaft 26 is in driving connection with the generator 5 through the propeller shaft 29 and suitable interposed universal connections 30, as well understood in the art.

The customary torque-arm 31 projects from the housing 15, being pivotally connected thereto, as at 32, and has its outer end provided with a ball 33 engaging within a socket-block or member 34, carried by a convenient part of the truck-frame 1. The socket-block 34 is preferably of a yielding material, such, for instance, as soft rubber, so as to cushion the connection between the torque-arm and the truck-frame for the purpose of absorbing shocks and vibrations to which one or the other of the torque-arm or truck-frame may be subjected under operating conditions. This yielding connection of the torque-arm with the truck-frame also allows for yielding movements of the sleeve 6 and parts carried thereby relative to the axle due to the interposed yielding drive members 7. The socket-block 34, which is preferably made in a single piece, is held to a cross-member of the truck-frame by a band 35 that fits the outer contour of the block and is bolted at its ends to the truck-frame. The mouth of the block-socket is preferably reduced in size with respect to the socket, so as to require a stretching or expansion of the mouth when inserting the engaging ball member 33 into the socket.

It is apparent that the interposing of the cushions or yielding drive members 7 between the drive axle 2 and sleeve 6 will impart a positive driving action from one to the other at full load under all driving conditions, and at the same time will absorb any sudden driving shocks and vibration that is present in the axle without interfering with the axle movement or with the normal flexing thereof under load conditions as would be the case if a positive type of clamp were used. This cushion drive also permits a flexing of the axle, for which allowance in the building of the axle is made, without transmitting to the sleeve 6 strains or distortion incident to such flexing action.

An important feature of the invention is the provision of a drive mechanism of the character described, which can be completely assembled as a unit, bearings and gears properly adjusted and lubricated, and bearing surfaces closed under clean conditions on a shop bench by expert mechanics and the whole mechanism then mounted as a unit on the axle by merely slipping the unit into position on the axle from one end thereof and securing it in operative relation thereon by means of the drive collars 7. This avoids crude workmanship, inadjustments and uncleanliness, which are likely to accompany the coarser work of assembly of the car truck; also insuring that no dirt or other foreign matter be permitted to get into the mechanism during assembly.

I wish it understood that my invention is not limited to any specific construction, arrangement or form of the parts, as it is capable of numerous modifications and changes without departing from the spirit of the claims, and also that while I have shown a particular form of gearing, this is merely illustrative of one form of means for transmitting power from the sleeve 6, and may be changed without affecting the invention.

Having thus described my invention, what I claim as new and desire to secure by United States Letter Patent is:

1. In an axle drive, an axle, a sleeve encircling the axle in spaced relation thereto, soft rubber collars interposed between the ends of the sleeve and the axle, said rubber collars being of such size and shape as to fill only part of the space between the sleeve and the axle, adjustable means carried by the sleeve ends for endwise compressing the collars to effect a radial expansion thereof to firmly grip the opposing surfaces of the axle and sleeve to cause by said gripping action alone a yielding driving of one from the other, means for locking said adjusting means in adjusted position, and means connected to and positively driven by said sleeve.

2. In an axle drive, an axle having a portion gradually reduced in diameter between axially spaced points thereof to facilitate flexing under load, a power transmitting sleeve encircling the reduced portion of the axle in spaced relation thereto, and yielding spacing members interposed between respective ends of the sleeve and an associated tapered portion of the axle, said members being spaced apart axially and providing a yielding driving connection between the sleeve and axle and permitting normal flexing of the axle relative to the sleeve.

3. In an axle drive, an axle having a portion gradually reduced in diameter between axially spaced points thereof to facilitate flexing under load, a power transmitting sleeve encircling the reduced portion of the axle in spaced relation thereto and having an annular seat at each end substantially parallel to the tapering portion of the axle which it encircles, and a yielding collar engaging each of said seats and a respective tapering portion of the shaft, and providing a yielding driving connection between the axle and sleeve which permits normal flexing relative to the sleeve.

4. In an axle drive, an axle having a portion gradually reduced in diameter between axially spaced points thereof to facilitate flexing under load, a power transmitting sleeve encircling the reduced portion of the axle in spaced relation thereto and having an annular tapered seat at each end substantially parallel to the tapering portion of the axle which it encircles, a yielding collar engaging each of said seats and a respective tapering portion of the shaft and providing a yielding driving connection between the axle and sleeve which permits normal flexing relative to the sleeve, and means for adjustably applying longitudinal pressing forces against the ends of said yielding collars.

5. In combination with a rotatable axle having an elongated smooth portion of substantially uniform cross section, a drive unit having a sleeve of fixed size surrounding said axle to form a space between the sleeve and said portion of the axle, and a set of axially spaced rubber bushings of relatively large thickness tightly fitted within said space in direct contact with said smooth axle portion at the ends of said sleeve, each bushing being split into sections so that said sections may be assembled immediately adjacent the sleeve ends and forced into position subsequent to the operation of placing the sleeve on the axle.

6. For use in combination with standard rotatable axles which may be tapered or vary slightly in diameters, a drive apparatus designed to fit any one of said standard axles regardless of said taper or said slight variation in size, said drive apparatus comprising a drive unit which may be completely assembled apart from the axle and subsequently fitted quickly in preassembled form upon the axle, said drive unit comprising a rigid sleeve of sufficient diameter to slide freely lengthwise of the axle, a housing containing driving mechanism, said sleeve and said mechanism being journaled in said housing, and said drive apparatus further including deformable elements and means for adjustably deforming said elements to establish a driving connection between said sleeve and the selected axle.

7. In the driving apparatus defined in claim 7, said preassembled drive unit including bearings surrounding said sleeve for journaling the latter in said housing, said bearings being made of standard fixed size as permitted by the predetermined fixed sizes of the sleeve and housing.

8. For use in combination with standard rotatable axles that may vary slightly in diameter, a drive apparatus including an assembled unit the parts of which are all formed to predetermined dimensions in quantity production prior to association with the axle, said assembled unit comprising a rigid one-piece sleeve of a fixed predetermined diameter loosely surrounding the axle, a housing surrounding said sleeve, driving means journalled in said housing and coupled to said sleeve, and bearings of the antifriction type fitted between said housing and said sleeve, the races of said bearing being made of standard one-piece construction as permitted by the predetermined fixed sizes of the sleeve and housing, and said drive apparatus further comprising adjustable deformable means located at each end of the sleeve for adapting said sleeve for proper support by the axle in driving connection therewith.

9. In combination with a rotatable axle, a drive unit including a rigid sleeve surrounding said axle in spaced relation thereto, and means for establishing a flexible but noiseless driving connection between said sleeve and said axle, said means including several axially spaced relatively short and thick rubber bushings and means longitudinally compressing said bushings to shorten and further thicken the latter and thus urge them into gripping surface engagement with the sleeve and the axle.

10. In combination with a rotatable axle, a rigid sleeve loosely surrounding said axle, and deformable means fitted between and in direct contact with said axle and said sleeve, said deformable means being of such size and shape as to fill only a part of the volumetric space between said axle and said sleeve, whereby substantially the entire mass of said means may flow freely in axial direction upon distortion during axle operation, and means for endwise compressing said deformable means to obtain non-slipping surface contact between said deformable means and said sleeve and said axle to thereby establish a frictional drive between the sleeve and the axle.

11. In combination with a rotatable axle, a rigid sleeve loosely surrounding said axle, deformable elastic means fitted between said axle and said sleeve and filling only part of the volumetric space therebetween, means urging said deformable means into non-slipping contact with said axle and said sleeve to establish a yielding drive connection therebetween, and a rigid device carried by said axle for rotation as a unit therewith and having a portion overlapped longitudinally of the sleeve, said portion having a slight clearance with respect to the sleeve circumferentially thereof.

CLARENCE W. SPICER.